United States Patent Office 3,106,513
Patented Oct. 8, 1963

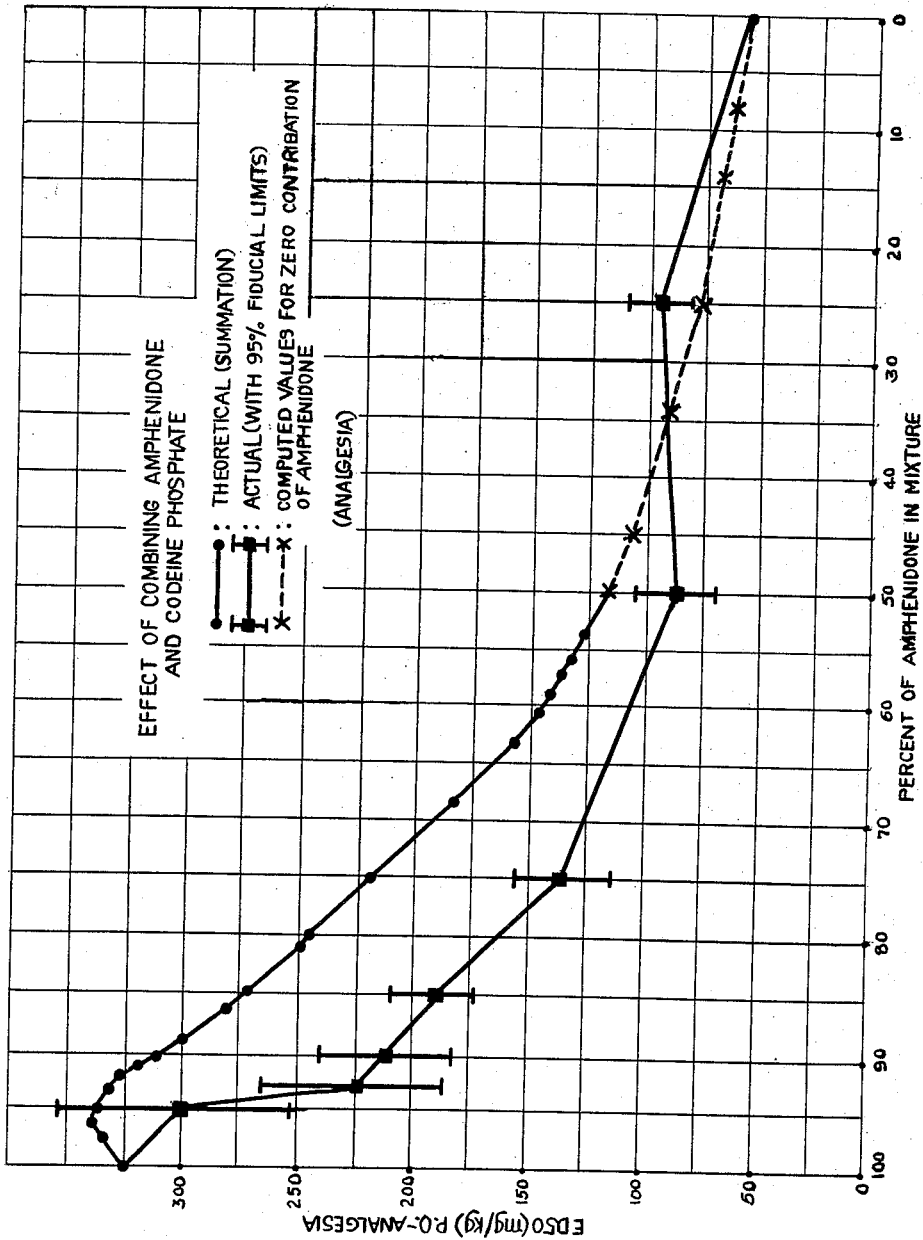

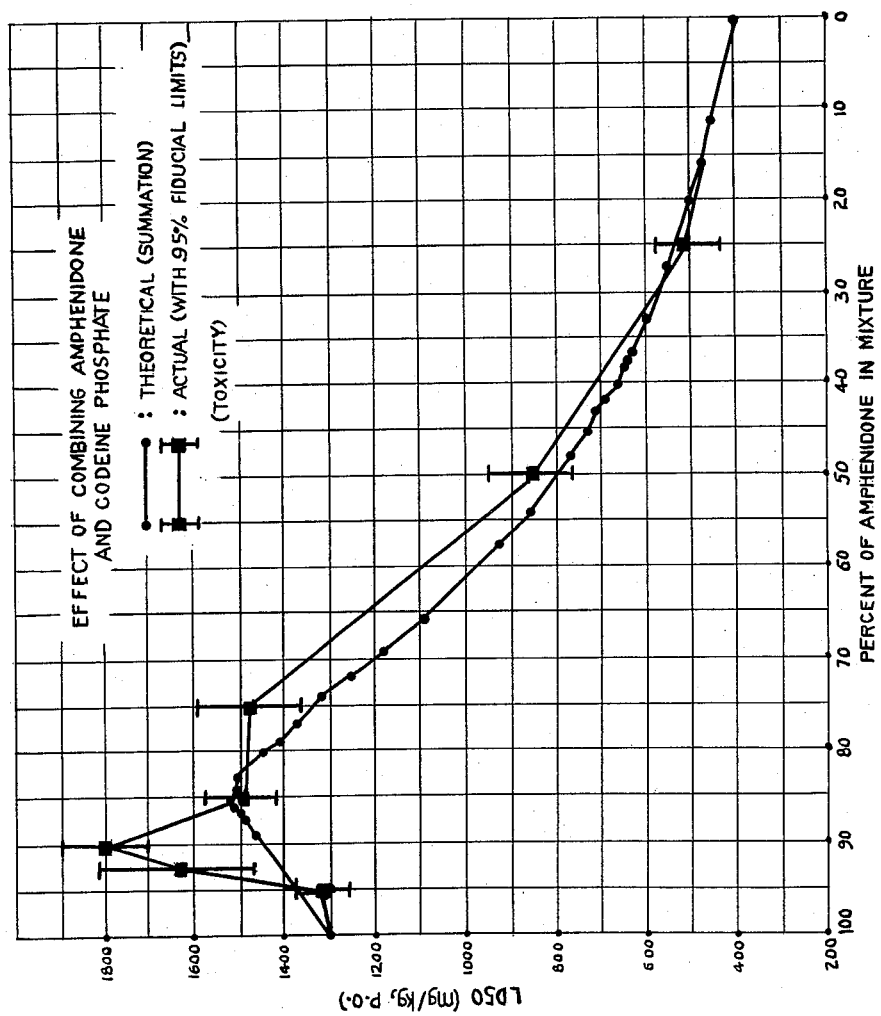

3,106,513
SYNERGISTIC ANALGESIC COMPOSITION OF 1-(m - AMINOPHENYL) - 2 - PYRIDONE AND MORPHINE DERIVATIVES
John F. Reinhard, Upper Montclair, N.J., assignor to Wallace & Tiernan Inc., Belleville, N.J., a corporation of Delaware
Filed Nov. 6, 1961, Ser. No. 150,383
6 Claims. (Cl. 167—65)

The invention relates to analgesic compositions comprising codeine, morphine, and like analgesic morphine derivatives in their free base form or in the form of their addition salts mixed with a substituted m-aminophenyl-2-pyridone as free base or the addition salt, these amino compounds having the structural formula:

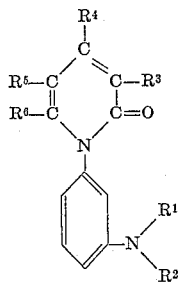

in which $R^3$, $R^4$, $R^5$ and $R^6$ are substituents selected from the group consisting of hydrogen and lower alkyl groups; and also the compound in which $R^4$ is phenyl and in which the substituents $R^3$, $R^5$ and $R^6$ are each hydrogen; and wherein, in all said compounds of said groups above, $R^1$ and $R^2$ are substituents selected from the group which consists of lower alkyl groups, lower alkanoic acid acyl and hydrogen; and including the non-toxic mineral acid addition salts of the aforesaid amino compounds.

Representative mixtures on which most of the experimental work was carried out are the mixtures of codeine phosphate and 1-(m-aminophenyl)-2-pyridone, the latter compound having been given the generic name of amphenidone.

An object of the invention is to provide an analgesic composition containing codeine, morphine, or other analgesic morphine derivative, wherein the amount of morphine derivative required for analgesia is substantially reduced by combination with a drug which brings about a synergism.

Synergism has been defined in various ways, but for present purposes the definition by Wells will be used (Drill, V. A., Pharmacology in Medicine, 1958, p. 12) namely, that "The response to a mixture of drugs is greater than the sum of the responses to the individual ingredients."

While amphenidone was known to have analgesic, muscle relaxing, and tranquilizing properties, the use of this material with another analgesic would not be warranted unless the combination with the other analgesic would exhibit synergism.

I discovered that the combination of codeine phosphate and amphenidone in the proportion of approximately 50 percent to 93 percent by weight of amphenidone on the total drug content exhibited analgesic synergism which was particularly marked in the range of 75 percent to 93 percent amphenidone with 25 percent to 7 percent codeine phosphate. Mixtures containing 95 percent and 25 percent of amphenidone with 5 percent to 75 percent codeine phosphate showed only additive effects.

Studies were also made to determine whether the undesirable property of toxicity was potentiated similarly to the potentiation of the desirable property of obtunding pain. It was discovered that mixtures containing codeine and amphenidone in the range of 50 percent to 93 percent amphenidone with 50 percent to 7 percent of codeine, are either antagonistic or simply additive with respect to acute oral toxicity.

Thus the potentiation of a useful property of the above drug combination, namely the ability to obtund pain (analgesia) is not obtained at the expense of a corresponding increase in toxicity. Indeed, in the range of 90–93 percent amphenidone with 10–7 percent codeine phosphate, the toxicity of the drugs in combination was actually reduced significantly below the value expected from the summation of their separate activities. This discovery thus enhances the overall utility of the combinations.

The same synergistic effects are obtained with morphine-amphenidone mixtures in substantially the same proportions of drugs. The codeine and morphine can be used in free base form or in the form of the addition salts such as the phosphate, sulfate and hydrochloride. Likewise the amphenidone or the substituted amphenidones coming under the above formula, can be used as the free base or acid addition salts such as the phosphate, sulfate, or hydrochloride.

The proportions given are on the basis of amphenidone or like base and codeine, phosphate, or morphine sulfate. They will be approximately the same for the salts of amphenidone with the base or other salts of codeine and morphine.

The following gives details of the studies on combinations of codeine phosphate and amphenidone:

DETERMINATION OF ANALGESIC ACTIVITY

Analgesic activity was determined by the method of Eddy and Leimbach (J. Pharmacol. 107: 385, 1953): Adult male mice (18–26 grams, C. F. #1 strain) in groups of 10 are placed on a metallic surface maintained at 54–55° C. In 90 percent of the normal, untreated animals pain responses (blowing on the paws and/or jumping, both hind feet leaving the plate) can be elicited within 10 seconds. The actual range observed in a large study was 2.4 to 34.5 seconds.

Consequently, the cut-off time was fixed at 40 seconds.

ANALGESIC ACTIVITY OF AMPHENIDONE AND CODEINE PHOSPHATE, SEPARATELY

Amphenidone and codeine phosphate, suspended in 10 percent acacia, were administered by stomach tube to C.F. No. 1 adult male mice (18–26 grams) in groups of 10 at doses ranging from 125 to 750 mg./kg. for amphenidone and 25 to 125 mg./kg. for codeine phosphate. One-half hour later (time of peak effect) the animals were exposed to the hot plate as described above, and the numbers failing to exhibit a pain response within 40 seconds were recorded as analgesic. The dose required to produce analgesia in 50 percent of the treated animals, together with the 95 percent fiducial limits and chi-square were computed graphically, according to Litchfield and Wilcoxon (J. Pharmacol. 96: 99, 1949). The results have been summarized in Table I.

Table I.—*Analgesic Activity of Amphenidone and Codeine Phosphate, Separately*

CODEINE PHOSPHATE

| Dose (mg./kg.) | Number showing analgesia/ number injected | Percent showing analgesia | $ED_{50}$ (mg./kg.) | 95% fiducial limits | Chi-square | |
|---|---|---|---|---|---|---|
| | | | | | Calculated | Tabular |
| 25 | 0/10 | 0 (6.5) | 59 | 43–75 | 5.25 | 11.10 |
| 50 | 3/10 | 30 | | | | |
| 75 | 6/10 | 60 | | | | |
| 112.5 | 8/10 | 80 | | | | |
| 150 | 10/10 | 100 (96.5) | | | | |

AMPHENIDONE

| Dose (mg./kg.) | Number showing analgesia/ number injected | Percent showing analgesia | $ED_{50}$ (mg./kg.) | 95% fiducial limits | Chi-square | |
|---|---|---|---|---|---|---|
| | | | | | Calculated | Tabular |
| 125 | 0/10 | 0 (1.0) | 325 | 290–364 | 0.18 | 7.82 |
| 250 | 3/10 | 30 | | | | |
| 375 | 13/20 | 65 | | | | |
| 500 | 8/10 | 80 | | | | |
| 750 | 10/10 | 100 (97.4) | | | | |

Based on the $ED_{50}$ values, codeine phosphate is shown to be 5.5 times as potent as amphenidone. The calculated chi-square values are less than the tabular values.

Table 2 shows the responses of both drugs, codeine phosphate and amphenidone, over a wide range of doses.

Table 2.—*Summation of Effects of Amphenidone and Codeine Phosphate*

| X Amphenidone | Y Codeine | $X_1$ Amphenidone | $Y_1$ Codeine | $ED_{50}$ $(X_1+Y_1)$ calculated, mg./kg. | Percent of amphenidone in mixture $\frac{X_1}{X_1+Y_1} \times 100$ (calculated) |
|---|---|---|---|---|---|
| Response: Percent analgesic | | Dose: mg./kg. | | | |
| 0 | 50 | .5 | 59 | 64 | 7.8 |
| 0 | 50 | 10 | 59 | 69 | 14.5 |
| 0 | 50 | 19.7 | 59 | 78.7 | 25.0 |
| 0 | 50 | 29.5 | 59 | 88.5 | 33.3 |
| 0 | 50 | 47.2 | 59 | 106.2 | 44.4 |
| 0 | 50 | 59 | 59 | 118 | 50.0 |
| 0.01 | 49.99 | 68.5 | 59 | 127.5 | 53.7 |
| 0.02 | 49.98 | 75 | 59 | 134 | 56.0 |
| 0.03 | 49.97 | 78 | 59 | 137 | 56.9 |
| 0.05 | 49.95 | 84 | 59 | 143 | 58.7 |
| 0.10 | 49.9 | 90 | 59 | 149 | 60.4 |
| 0.20 | 49.8 | 100 | 59 | 159 | 62.9 |
| 1.0 | 49.0 | 125 | 58 | 183 | 68.3 |
| 5.0 | 45.0 | 165 | 55 | 220 | 75.0 |
| 10.0 | 40.0 | 195 | 50 | 245 | 79.6 |
| 12.5 | 37.5 | 200 | 48 | 248 | 80.6 |
| 20.0 | 30.0 | 230 | 42 | 272 | 84.6 |
| 25.0 | 25.0 | 245 | 38 | 283 | 86.6 |
| 30.0 | 20.0 | 265 | 35 | 300 | 88.3 |
| 35.0 | 15.0 | 280 | 31 | 311 | 90.0 |
| 37.5 | 12.5 | 290 | 29 | 319 | 90.9 |
| 40.0 | 10.0 | 300 | 27 | 327 | 91.7 |
| 45.0 | 5.0 | 310 | 21 | 331 | 93.7 |
| 47.5 | 2.5 | 320 | 17.5 | 337.5 | 94.8 |
| 49.0 | 1.0 | 325 | 14 | 339 | 95.9 |
| 49.8 | 0.2 | 325 | 10 | 335 | 97.0 |

For example, referring to the above table for a 25 percent response by both drugs, a combination of 245 mg./kg. of amphenidone and 38 mg./kg. of codeine phosphate would be required if the drugs act by simple summation. This would correspond to a mixture containing 86.6 percent of amphenidone and 13.4 percent of codeine. By the same procedure, all of the various combinations shown in Table 2 have been calculated.

A theoretical curve has been constructed from the data of Table 2 (FIG. 1). Values of 100 and 0 on the abscissa correspond to $ED_{50}$'s for pure amphenidone (325) and codeine phosphate (59), respectively. Note that this curve is not a straight line, between these two points, as has long been assumed e.g. by Chen and Portman (A.M.A. Archives of Neurology and Psychiatry 68: 510–14, 1952).

Based on the conventional procedure in which 10 (ten) animals are used per dose point a 10 percent effect, i.e., 1 (one) out of 10 (ten) animals exhibiting analgesia, would be the minimum recognizable response. A dose of 27 mg./kg. of codeine phosphate, or 195 mg./kg. of amphenidone would be required for this minimal effect. Nevertheless, in Table 2 values below these critical levels have been computed for the purpose of completing the curve shown in FIG. 1. Actual doses of drugs shown in the first six and the last four lines of Table 2 were selected with reference to percentage composition of the mixtures, the activity contribution being zero in the case of amphenidone, and essentially nil for codeine phosphate, respectively.

The theoretical curve of summation was constructed as a frame of reference, hence $ED_{50}$'s of actual physical mixtures falling clearly below the curve represent synergistic combinations of the two drugs. Theoretically, mixtures could show summation synergism or antagonism, depending on whether their $ED_{50}$ values fell on, below, or above the curve.

Effects of actual combinations are presented in the following section.

DETERMINATION OF SYNERGISM

Seven physical mixtures of amphenidone and codeine phosphate were prepared containing 95, 93, 90, 85, 75, 50, and 25 percent of amphenidone by weight. The $ED_{50}$ of each mixture was determined as described above and results have been summarized in Table 3, FIG. 1. Table 3 is given below:

Table 3.—*Analegesic Activity of Amphenidone-Codeine Phosphate Mixtures*

(1) Amphenidone 95% (2,850 mg.); codeine phosphate 5% (150 mg.)

| Dose (mg./kg.) | Number showing analgesia/ number injected | Percent | $ED_{50}$ (mg./kg.) | 95% fiducial limits | Chi-square | | Comment |
|---|---|---|---|---|---|---|---|
| | | | | | Calculated | Tabular | |
| 150 | 0/10 | 0 | 300 | 254–354 | 3.21 | 7.82 | Indeterminate. |
| 225 | 3/10 | 30 | | | | | |
| 300 | 7/10 | 70 | | | | | |
| 450 | 8/10 | 80 | | | | | |
| 600 | 10/10 | 100 | | | | | |

(2) Amphenidone 93% (2,790 mg.); codeine phosphate 7% (210 mg.)

| Dose (mg./kg.) | Number showing analgesia/ number injected | Percent | $ED_{50}$ (mg./kg.) | 95% fiducial limits | Chi-square | | Comment |
|---|---|---|---|---|---|---|---|
| | | | | | Calculated | Tabular | |
| 150 | 1/10 | 10 | 220 | 185–262 | .48 | 5.99 | Synergism. |
| 225 | 4/10 | 40 | | | | | |
| 300 | 8/10 | 80 | | | | | |
| 450 | 10/10 | 100 | | | | | |

*Table 3*—Continued (3) Amphenidone 90% (2,700 mg.); codeine phosphate 10% (300 mg.)

| Dose (mg./kg.) | Number showing analgesia/ number injected | Percent | $ED_{50}$ (mg./kg.) | 95% fiducial limits | Chi-square Calculated | Chi-square Tabular | Comment |
|---|---|---|---|---|---|---|---|
| 150 | 1/10 | 10 | 210 | 183–242 | .34 | 5.99 | Synergism |
| 200 | 4/10 | 40 | | | | | |
| 250 | 7/10 | 70 | | | | | |
| 350 | 10/10 | 100 | | | | | |

(4) Amphenidone 85% (2,550 mg.); codeine phosphate 15% (450 mg.)

| Dose (mg./kg.) | Number showing analgesia/ number injected | Percent | $ED_{50}$ (mg./kg.) | 95% fiducial limits | Chi-square Calculated | Chi-square Tabular | Comment |
|---|---|---|---|---|---|---|---|
| 80 | 0/10 | 0 | 190 | 173–209 | 2.31 | 7.82 | Synergism. |
| 160 | 2/10 | 20 | | | | | |
| 180 | 4/10 | 40 | | | | | |
| 200 | 7/10 | 70 | | | | | |
| 240 | 7/10 | 70 | | | | | |
| 320 | 10/10 | 100 | | | | | |

(5) Amphenidone 75% (2,250 mg.); codeine phosphate 25% (750 mg.)

| Dose (mg./kg.) | Number showing analgesia/ number injected | Percent | $ED_{50}$ (mg./kg.) | 95% fiducial limits | Chi-square Calculated | Chi-square Tabular | Comment |
|---|---|---|---|---|---|---|---|
| 65 | 0/10 | 0 | 135 | 115–158 | 1.41 | 9.49 | Synergism. |
| 97.5 | 3/10 | 30 | | | | | |
| 130 | 4/10 | 40 | | | | | |
| 162.5 | 6/10 | 60 | | | | | |
| 195 | 8/10 | 80 | | | | | |
| 260 | 10/10 | 100 | | | | | |

(6) Amphenidone 50% (1,500 mg.); codeine phosphate 50% (1,500 mg.)

| Dose (mg./kg.) | Number showing analgesia/ number injected | Percent | $ED_{50}$ (mg./kg.) | 95% fiducial limits | Chi-square Calculated | Chi-square Tabular | Comment |
|---|---|---|---|---|---|---|---|
| 23.8 | 0/10 | 0 | 87 | 80–106 | 3.08 | 5.99 | Synergism. |
| 47.5 | 2/20 | 10 | | | | | |
| 95 | 7/10 | 70 | | | | | |
| 142.5 | 16/20 | 80 | | | | | |
| 190 | 17/20 | 85 | | | | | |

(7) Amphenidone 25% (750 mg.); codeine phosphate 75% (2,250 mg.)

| Dose (mg./kg.) | Number showing analgesia/ number injected | Percent | $ED_{50}$ (mg./kg.) | 95% fiducial limits | Chi-square Calculated | Chi-square Tabular | Comment |
|---|---|---|---|---|---|---|---|
| 30 | 1/10 | 0 | 95 | 81–111 | 3.75 | 5.99 | Indeterminate. |
| 45 | 1/10 | 0 | | | | | |
| 60 | 1/10 | 0 | | | | | |
| 90 | 3/10 | 30 | | | | | |
| 120 | 8/10 | 80 | | | | | |
| 150 | 10/10 | 100 | | | | | |

From FIG. 1, it will be apparent that mixtures containing 95 and 25 percent amphenidone showed indeterminate effects, whereas the remaining mixtures (93%, 90%, 85%, 75%, and 50%) showed synergism. From FIG. 1 "expected" $ED_{50}$'s were obtained from the theoretical curve of addition and compared to values actually found.

Table 4, given below, summarizes the results in tabular form.

*Table 4*

| Percent amphenidone in mixture | $ED_{50}$'s (mg./ kg.) expected | Found | Percent decrease |
|---|---|---|---|
| 93 | 332.5 | 220 | 33.8 |
| 90 | 310 | 210 | 32.3 |
| 85 | 275 | 190 | 30.9 |
| 75 | 220 | 135 | 38.6 |

Results summarized in Table 4 reveal that the experimental values were 30 percent less than the values expected from summation, except for the 95 percent mixture which did not show synergism. The contribution of amphenidone at the 50 percent level was very little.

CONCLUSION

It is concluded:

(1) That mixtures containing amphenidone (A) and codeine phosphate (C) in the following percentages are markedly synergistic with respect to analgesic activity:

93% A, 7% C
90% A, 10% C
85% A, 15% C
75% A, 25% C (2) Such mixtures have utility in that the amount of codeine phosphate required for analgesia was reduced as much as 38 percent by combination with amphenidone.

DETERMINATION OF ACUTE ORAL TOXICITY

Test preparations, suspended in 10 percent gum acacia, were administered to adult albino mice (C.F. #1 males, 17–27 grams) in groups of 10 or more at doses ranging from 500 to 2000 mg./kg. Signs of toxicity included depression of the central nervous system without preliminary excitation. Specifically, the following signs were noted with increasing dosage: Loss of equilibrium, muscular flaccidity, loss of the righting reflex, surgical anesthesia, and death within 24 hours from respiratory paralysis. In addition, responses to painful stimuli were reduced. At necropsy there were no gross signs of irritation or of organ pathology. Surviving animals exhibited no signs of latent toxicity. Kills were tallied after 24 hours and the dose required for 50 percent mortality ($LD_{50}$) together with 95 percent fiducial limits and chi-square were computed graphically according to Litchfield and Wilcoxon (J. Pharmacol. 96:99, 1949).

ACUTE ORAL TOXICITY OF AMPHENIDONE AND CODEINE PHOSPHATE, SEPARATELY

Toxicity data for each of the compounds, including $LD_{50}$ values with 95 percent fiducial limits, and chi-square determinations for linearity have been summarized in Table 5. Based on $LD_{50}$ values, codeine phosphate was 3.3 times as toxic as amphenidone. Table 5 is given below:

*Table 5.—Acute Oral Toxicity of Amphenidone and Codeine Phosphate, Separately*

CODEINE PHOSPHATE

| Dose (mg./kg.) | Number Dead/ number injected | Percent dead | $LD_{50}$ (mg./kg.) | 95% fiducial limits (mg./kg.) | Chi-square Calculated | Chi-square Tabular |
|---|---|---|---|---|---|---|
| 200 | 0/10 | 0 | 400 | 348–460 | 1.19 | 5.99 |
| 300 | 1/10 | 10 | | | | |
| 400 | 6/10 | 60 | | | | |
| 500 | 7/10 | 70 | | | | |
| 600 | 10/10 | 100 (97.7) | | | | |

AMPHENIDONE

| 800 | 0/10 | 0 (4.4) | 1,300 | 1,000–1,700 | 1.31 | 5.99 |
|---|---|---|---|---|---|---|
| 1,000 | 6/20 | 30 | | | | |
| 1,500 | 10/15 | 67 | | | | |
| 2,000 | 17/20 | 85 | | | | |

Table 6 shows the mortality responses of both drugs over a wide range of doses. For example, for a 25 percent response by both drugs, a combination of 980 mg./kg. of amphenidone and 340 mg./kg. of codeine phosphate would be required if the drugs act by simple summation. This would correspond to a mixture containing 74.2 percent of amphenidone and 25.8 percent codeine. All of the various combinations shown in Table 6 have been computed in similar fashion. Table 6 is given below.

*Table 6.—Summation of Effects of Amphenidone and Codeine Phosphate*

| X Amphenidone | Y Codeine | $X_1$ Amphenidone | $Y_1$ Codeine | $LD_{50}$ $(X_1+Y_1)$ calculated mg./kg. | Percent of amphenidone in mixture $\frac{X_1}{X_1+Y_1} \times 100$ (calculated) |
|---|---|---|---|---|---|
| Response: Percent kill | | Dose: mg./kg. | | | |
| 0 | 50 | 50 | 400 | 450 | 11.1 |
| 0 | 50 | 75 | 400 | 475 | 15.8 |
| 0 | 50 | 100 | 400 | 500 | 20.0 |
| 0 | 50 | 150 | 400 | 550 | 27.3 |
| 0 | 50 | 200 | 400 | 600 | 33.3 |
| 0 | 50 | 225 | 400 | 625 | 36.0 |
| 0 | 50 | 240 | 400 | 640 | 37.5 |
| 0.01 | 49.99 | 250 | 400 | 650 | 38.5 |
| 0.02 | 49.98 | 270 | 400 | 670 | 40.3 |
| 0.03 | 49.97 | 290 | 400 | 690 | 42.0 |
| 0.05 | 49.95 | 310 | 400 | 710 | 43.7 |
| 0.10 | 49.90 | 335 | 400 | 735 | 45.6 |
| 0.20 | 49.80 | 370 | 400 | 770 | 48.1 |
| 1.0 | 49.0 | 470 | 395 | 865 | 54.3 |
| 5.0 | 45.0 | 540 | 390 | 930 | 58.1 |
| 10.00 | 40.0 | 720 | 370 | 1,090 | 66.1 |
| 15.0 | 35.0 | 820 | 360 | 1,180 | 69.5 |
| 20.0 | 30.0 | 900 | 350 | 1,250 | 72.0 |
| 25.0 | 25.0 | 980 | 340 | 1,320 | 74.2 |
| 30.0 | 20.0 | 1,050 | 320 | 1,370 | 76.6 |
| 35.0 | 15.0 | 1,100 | 310 | 1,410 | 78.0 |
| 40.0 | 10.0 | 1,150 | 290 | 1,440 | 79.9 |
| 45.0 | 5.0 | 1,230 | 270 | 1,500 | 82.0 |
| 48.0 | 2.0 | 1,250 | 250 | 1,500 | 83.3 |
| 49.0 | 1.0 | 1,270 | 230 | 1,500 | 84.7 |
| 49.5 | 0.5 | 1,290 | 215 | 1,505 | 85.7 |
| 49.8 | 0.2 | 1,300 | 205 | 1,505 | 86.4 |
| 49.9 | 0.1 | 1,300 | 195 | 1,495 | 87.0 |
| 49.95 | 0.05 | 1,300 | 185 | 1,485 | 87.5 |
| 49.99 | 0.01 | 1,300 | 168 | 1,468 | 88.6 |
| 50.00 | 0 | 1,300 | ----- | 1,300 | 100.0 |

Effects of actual combinations are presented in the following section.

DETERMINATION OF SYNERGISM

Seven physical mixtures of amphenidone and codeine phosphate were prepared, containing 95, 93, 90, 85, 75, 50, and 25 percent of amphenidone by weight. The $LD_{50}$ of each mixture was determined as described above and results have been summarized in Table 7, given below:

*Table 7.—Acute Oral Toxicity of Amphenidone-Codeine Mixtures*

(1) Amphenidone 95%; codeine phosphate 5%

| Dose (mg./kg.) | Number dead/ number dosed | Percent | $LD_{50}$ (mg./kg.) | 95% limits (mg./kg.) | Chi-square Calculated | Chi-square Tabular | Comment |
|---|---|---|---|---|---|---|---|
| 1,040 | 2/20 | 10 | 1,320 | | 124.1 | 7.8 | Non-linear summation. |
| 1,300 | 5/30 | 17 | | | | | |
| 1,430 | 7/30 | 23 | | | | | |
| 1,495 | 20/20 | 100 | | | | | |
| 1,560 | 20/20 | 100 | | | | | |

(2) Amphenidone 93%; codeine phosphate 7%

| 1,200 | 0/10 | 0 | 1,625 | 1,464 to 1,804 | 1.6 | 7.8 | Antagonism. |
|---|---|---|---|---|---|---|---|
| 1,350 | 1/10 | 10 | | | | | |
| 1,500 | 4/10 | 40 | | | | | |
| 1,800 | 7/10 | 70 | | | | | |
| 2,100 | 9/10 | 90 | | | | | |

(3) Amphenidone 90%; codeine phosphate 10%

| 1,500 | 0/10 | 0 | 1,800 | 1,703 to 1,903 | 2.0 | 7.8 | Antagonism. |
|---|---|---|---|---|---|---|---|
| 1,650 | 4/10 | 40 | | | | | |
| 1,800 | 6/10 | 60 | | | | | |
| 1,950 | 7/10 | 70 | | | | | |
| 2,100 | 9/10 | 90 | | | | | |

(4) Amphenidone 85%; codeine phosphate 15%

| 1,400 | 0/10 | 0 | 1,490 | 1,412 to 1,572 | 1.6 | 6.0 | Summation. |
|---|---|---|---|---|---|---|---|
| 1,450 | 4/10 | 40 | | | | | |
| 1,500 | 5/10 | 50 | | | | | |
| 1,550 | 9/10 | 90 | | | | | |

Table 7.—Continued

(5) Amphenidone 75%; codeine phosphate 25%

| Dose (mg./kg.) | Number dead/ number dosed | Percent | LD₅₀ (mg./kg.) | 95% limits (mg./kg.) | Chi-square Calculated | Chi-square Tabular | Comment |
|---|---|---|---|---|---|---|---|
| 1,125 | 0/10 | 0 | | | | | |
| 1,350 | 2/10 | 20 | | | | | |
| 1,575 | 8/10 | 80 | | | | | |
| 1,605 | 9/10 | 90 | 1,475 | 1,372 to 1,586 | 3.5 | 11.0 | Summation. |
| 1,800 | 10/10 | 100 | | | | | |
| 1,876 | 9/10 | 90 | | | | | |
| 2,144 | 10/10 | 100 | | | | | |

(6) Amphenidone 50%; codeine phosphate 50%

| Dose (mg./kg.) | Number dead/ number dosed | Percent | LD₅₀ (mg./kg.) | 95% limits (mg./kg.) | Chi-square Calculated | Chi-square Tabular | Comment |
|---|---|---|---|---|---|---|---|
| 425 | 0/10 | 0 | | | | | |
| 633 | 1/10 | 10 | | | | | |
| 850 | 9/10 | 47 | 860 | 755 to 955 | 1.2 | 7.8 | Summation. |
| 956 | 6/10 | 60 | | | | | |
| 1,063 | 10/10 | 100 | | | | | |

(7) Amphenidone 25%; codeine phosphate 75%

| Dose (mg./kg.) | Number dead/ number dosed | Percent | LD₅₀ (mg./kg.) | 95% limits (mg./kg.) | Chi-square Calculated | Chi-square Tabular | Comment |
|---|---|---|---|---|---|---|---|
| 300 | 0/10 | 0 | | | | | |
| 375 | 2/10 | 20 | | | | | |
| 450 | 4/10 | 40 | 510 | 443 to 587 | .7 | 7.8 | Summation. |
| 600 | 7/10 | 70 | | | | | |
| 750 | 10/10 | 100 | | | | | |

It will be apparent that the LD₅₀'s of mixtures containing 93 and 90 percent of amphenidone fall above the theoretical curve, indicating significant decrease in toxicity; with respect to toxicity, therefore, these combinations appear to be antagonistic. The limits of error of LD₅₀'s of the remaining combinations coincide with the theoretical, indicating simple summation of toxicities. The theoretical curve, mentioned above, is shown in FIG. 2 of the drawing.

CONCLUSION (1) Mixtures containing amphenidone (A) and codeine phosphate (C) in the following percentages are either antagonistic or simply additive with respect to acute oral toxicity, as shown:

95% A, 5% C—additive
93% A, 7% C—antagonistic
90% A, 10% C—antagonistic
85% A, 15% C—additive
75% A, 25% C—additive
50% A, 50% C—additive
25% A, 75% C—additive (2) Since combinations synergistic with respect to analgesic activity are included in this group, namely, 93% A, 7% C; 90% A, 10% C; 85% A, 15% C; and 75% A, 25% C, it is concluded that potentiation of a useful property of these drugs, namely the ability to obtund pain (analgesia), is not obtained at the expense of a corresponding increase in toxicity. Indeed, in two instances (93 and 90 percent mixtures), the toxicity of the drugs in combination was actually reduced significantly below the value expected from summation of their separate activities. This discovery adds to the overall utility of the combinations.

The compositions of this invention have been found to be synergistic analgesic compositions useful for laboratory animals such as mice, rabbits, and the like. The results with such animals indicate utility for humans, but the clinical tests on humans have not been completed.

From the tests on laboratory animals, the safe and effective unit dose for humans is 15–30 mg. of codeine as codeine phosphate mixed with 200–400 mg. of amphenidone.

The following are formulae for tablets and capsules of amphenidone and codeine:

(1) Examples of tablets are below:

| Ingredient | Per tablet composition of 200 mg. amphenidone with codeine | |
|---|---|---|
| | A (mg.) | B (mg.) |
| Codeine USP (as SO₄ or PO₄ salt) | 15 | 30 |
| Amphenidone | 200 | 200 |
| Milk sugar USP | 20 | 20 |
| Powdered sugar USP | 15 | 15 |
| Starch USP | 40 | 25 |

Mix dry powders well and then granulate with a starch paste prepared from 1 lb. of starch dissolved in 1 gal. of boiling distilled water. Dry at 50° C. and reduce to #10 granule—then add:

| Ingredient | Per tablet composition of 200 mg. amphenidone with codeine | |
|---|---|---|
| | A (mg.) | B (mg.) |
| Magnesium stearate USP | 3.25 | 3.25 |
| Starch USP to make | 325 | 325 |

Compress using ⅜" punch of standard concavity.

(2) A satisfactory capsule can be prepared as follows:

| Ingredient | Per capsule composition of 200 mg. amphenidone with codeine | |
|---|---|---|
| | A (mg.) | B (mg.) |
| Codeine USP (as SO or PO salt) | 15 | 30 |
| Amphenidone | 200 | 200 |
| Magnesium stearate | 2.5 | 2.5 |
| Lactose USP to make | 250 | 250 |

Mix dry powders well and encapsulate into hard shell gelatin capsule.

I claim:

1. An analgesic composition consisting essentially of 50 percent to 7 percent by weight of a substance selected from the group consisting of morphine, analgesic morphine derivatives, and their therapeutically useful acid addition salts; and from 50 percent to 93 percent by weight of a m-amino compound of the group consisting of those having the formula:

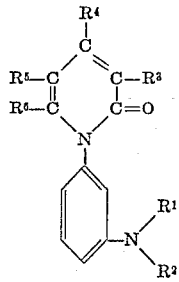

said compound being selected from the group consisting of: (a) the compounds in which $R^3$, $R^4$, $R^5$, and $R^6$ are substituents selected from the group consisting of hydrogen and lower alkyl groups, and (b) the compound in which $R^4$ is phenyl and in which the substituents $R^3$, $R^5$ and $R^6$ are each hydrogen; and wherein, in all said compounds of said groups (a) and (b) above, $R^1$ and $R^2$ are substituents selected from the group which consists of lower alkyl groups, lower alkanoic acid acyl and hydrogen; and the non-toxic mineral acid addition salts of the aforesaid amino compounds.

2. The analgesic composition of claim 1 wherein the analgesic morphine derivative is codeine.

3. A therapeutic composition exhibiting synergistic analgesic effect, said composition consisting essentially of from 50 percent to 7 percent by weight of a morphine mineral acid addition salt and from 50 percent to 93 percent by weight of 1-m-aminophenyl-2-pyridone.

4. A therapeutic composition exhibiting synergistic analgesic effect, said composition consisting essentially of from 50 percent to 7 percent by weight of a codeine mineral acid addition salt and from 50 percent to 93 percent by weight of 1-m-aminophenyl-2-pyridone.

5. A therapeutic composition consisting essentially of from 25 percent to 7 percent by weight of codeine phosphate and from 75 percent to 93 percent by weight of 1-m-aminophenyl-2-pyridone.

6. A therapeutic composition exhibiting combined synergism of analgesia and lowered toxicity consisting essentially of from 10 percent to 7 percent codeine phosphate by weight and from 90 percent to 93 percent of 1-m-aminophenyl-2-pyridone.

References Cited in the file of this patent

UNITED STATES PATENTS 2,947,755     Scudi et al. _____ Aug. 2, 1960

OTHER REFERENCES

New and Nonofficial Drugs (N.O.N.), 1959, p. 325.
Physician's Desk Reference (P.D.R.), 1961 ed., p. 639.